US012099440B1

(12) United States Patent
Sykes et al.

(10) Patent No.: US 12,099,440 B1
(45) Date of Patent: Sep. 24, 2024

(54) ACCESS-BASED DATA STORAGE IN SSD DEVICES

(71) Applicant: Kioxia Corporation, Tokyo (JP)

(72) Inventors: Robert Sykes, San Jose, CA (US); Gary Calder, San Jose, CA (US)

(73) Assignee: KIOXIA CORPORATION, Tokyo (JP)

( * ) Notice: Subject to any disclaimer, the term of this patent is extended or adjusted under 35 U.S.C. 154(b) by 150 days.

(21) Appl. No.: 16/731,586

(22) Filed: Dec. 31, 2019

(51) Int. Cl.
*G06F 12/02* (2006.01)
*G06F 11/07* (2006.01)
*G06F 11/30* (2006.01)
*G06F 12/0882* (2016.01)
*G06F 12/0891* (2016.01)

(52) U.S. Cl.
CPC ........ *G06F 12/0246* (2013.01); *G06F 11/076* (2013.01); *G06F 11/3037* (2013.01); *G06F 12/0253* (2013.01); *G06F 12/0882* (2013.01); *G06F 12/0891* (2013.01)

(58) Field of Classification Search
CPC ............. G06F 12/0246; G06F 12/0253; G06F 12/0882; G06F 12/0891; G06F 11/076; G06F 11/303076
See application file for complete search history.

(56) References Cited

U.S. PATENT DOCUMENTS

| | | | |
|---|---|---|---|
| 10,360,928 B1 * | 7/2019 | Brockie | G11B 5/09 |
| 2009/0157948 A1 * | 6/2009 | Trichina | G06F 12/0246 |
| | | | 711/E12.001 |
| 2009/0310408 A1 * | 12/2009 | Lee | G11C 16/0483 |
| | | | 365/185.09 |
| 2012/0239990 A1 * | 9/2012 | Mataya | G06F 12/0866 |
| | | | 714/704 |
| 2013/0054877 A1 * | 2/2013 | Yeh | G06F 12/0246 |
| | | | 711/E12.008 |
| 2013/0061019 A1 * | 3/2013 | Fitzpatrick | G06F 11/3409 |
| | | | 711/173 |
| 2013/0073822 A1 * | 3/2013 | Sandel | G06F 3/0616 |
| | | | 711/202 |
| 2014/0115239 A1 * | 4/2014 | Kong | G06F 12/0246 |
| | | | 711/103 |
| 2015/0227418 A1 * | 8/2015 | Cai | G06F 11/1048 |
| | | | 714/768 |
| 2015/0262714 A1 * | 9/2015 | Tuers | G11C 16/3422 |
| | | | 714/721 |
| 2015/0347029 A1 * | 12/2015 | Kotte | G06F 3/0611 |
| | | | 711/103 |
| 2017/0003880 A1 * | 1/2017 | Fisher | G06F 12/0246 |
| 2017/0371559 A1 * | 12/2017 | Higgins | G06F 3/0673 |
| 2018/0190362 A1 * | 7/2018 | Barndt | G06F 3/0619 |
| 2018/0356997 A1 * | 12/2018 | Gorobets | G06F 12/10 |
| 2019/0236005 A1 * | 8/2019 | Lee | G06F 3/0659 |

(Continued)

*Primary Examiner* — Nanci N Wong
(74) *Attorney, Agent, or Firm* — Foley & Lardner LLP

(57) ABSTRACT

Various implementations described herein relate to systems and methods for placing data on a Solid State Drive (SSD), including writing data to a non-volatile memory storage of the SSD, determining one or more of read errors, a number of invalid pages per block, or a read disturb counter for the data, determining access frequency of the data based on the one or more of the read errors, the number of invalid pages per block, or the read disturb counter, and partitioning the non-volatile memory storage into a plurality of regions based on the access frequency.

20 Claims, 4 Drawing Sheets

(56) References Cited

U.S. PATENT DOCUMENTS

| | | | | |
|---|---|---|---|---|
| 2019/0243552 A1* | 8/2019 | Maharana | ......... | G06F 15/17331 |
| 2019/0332298 A1* | 10/2019 | Madabhushi | ....... | G06F 12/1009 |
| 2020/0110536 A1* | 4/2020 | Navon | .................. | G06F 3/0616 |
| 2020/0142835 A1* | 5/2020 | Lin | ......................... | G06F 3/064 |
| 2020/0218653 A1* | 7/2020 | Ryu | .................... | G06F 12/0253 |
| 2021/0132800 A1* | 5/2021 | Papandreou | ........ | G06F 11/3495 |

* cited by examiner

ACCESS-BASED DATA STORAGE IN SSD DEVICES

TECHNICAL FIELD

The present disclosure relates generally to systems and methods for intelligently storing data in Solid State Drive (SSD) devices.

BACKGROUND

Enterprises and datacenters employ SSDs for storage. An SSD includes NAND flash memory devices, each of which includes one or more individual NAND flash dies on which data can be written (programmed), read, and erased. Each die has one or more planes. Each plane has multiple blocks, and each block has multiple pages. SSDs read and write (program) in pages and erase in blocks. Memory operations such as read operations, write operations, and erase operations have time durations dependent on NAND characteristics. Read and write latencies of enterprise or datacenter SSDs are preferred to be predicable. In addition, enterprise or datacenter SSDs are preferred to have a sustained performance rather than a variable performance.

A Flash Translation Layer (FTL) of a controller of the SSD can perform a logic-to-physical (L2P) operation in which a Logical Block Address (LBA) provided by a host computer connected to the SSD is translated into a physical address on the NAND flash memory devices of the SSD. Data corresponding to the LBA can be written to and read from the physical address on the NAND flash memory devices. Conventionally, the FTL places data on the NAND flash memory devices based on free area available. That is, the FTL assigns a physical address for an LBA based on whether an area corresponding to that physical address is free, so that the data can be written to that area. Such data placement mechanism has high peak latencies and random read performances compared to Input/Output Determinism (IOD) or Streams SSDs, given that as data is written based on availability, pages containing valid data are mixed with pages containing outdated, invalid data.

IOD SSDs and Streams SSDs improve read and write latencies by writing data to known locations or regions of NAND flash memory devices. Although IOD SSDs are intended to provide guaranteed read access times (within a deterministic mode, while garbage collection and clean-up activities take place in a non-deterministic mode), significant host intervention and controller firmware have to be introduced in order to provide latency. In addition, for Streams SSDs the host may have to assign a label or stream identifier for every write operation specifying the locations or regions to which the data is to be written. In both cases, it is incumbent on the host to provide assistance to the SSD by setting the deterministic/non-determinist mode or using labels/identifiers when performing I/O operations in order to achieve the required latencies and access times.

SUMMARY

In certain aspects, the present implementations are directed to placing data in a non-volatile memory storage of an SSD, including writing data to a non-volatile memory storage of the SSD, determining one or more of read errors, a number of invalid pages per block, or a read disturb counter for the data, determining access frequency of the data based on the one or more of the read errors, the number of invalid pages per block, or the read disturb counter, and partitioning the non-volatile memory storage into a plurality of regions based on the access frequency. Each of the plurality of regions includes one or more blocks.

In some aspects, an SSD device includes a non-volatile memory storage and a controller that writes data to the non-volatile memory storage, determines one or more of read errors, a number of invalid pages per block, or a read disturb counter for the data, determines access frequency of the data based on the one or more of the read errors, the number of invalid pages per block, or the read disturb counter, and partitions the non-volatile memory storage into a plurality of regions based on the access frequency. Each of the plurality of regions includes one or more blocks.

In some aspects, a non-transitory computer-readable medium storing computer-readable instructions, such that when executed, causes a controller of an SSD device to write data to a non-volatile memory storage of the SSD, determine one or more of read errors, a number of invalid pages per block, or a read disturb counter for the data, determine access frequency of the data based on the one or more of the read errors, the number of invalid pages per block, or the read disturb counter, and partition the non-volatile memory storage into a plurality of regions based on the access frequency. Each of the plurality of regions includes one or more blocks.

DETAILED DESCRIPTION

Figure 1:
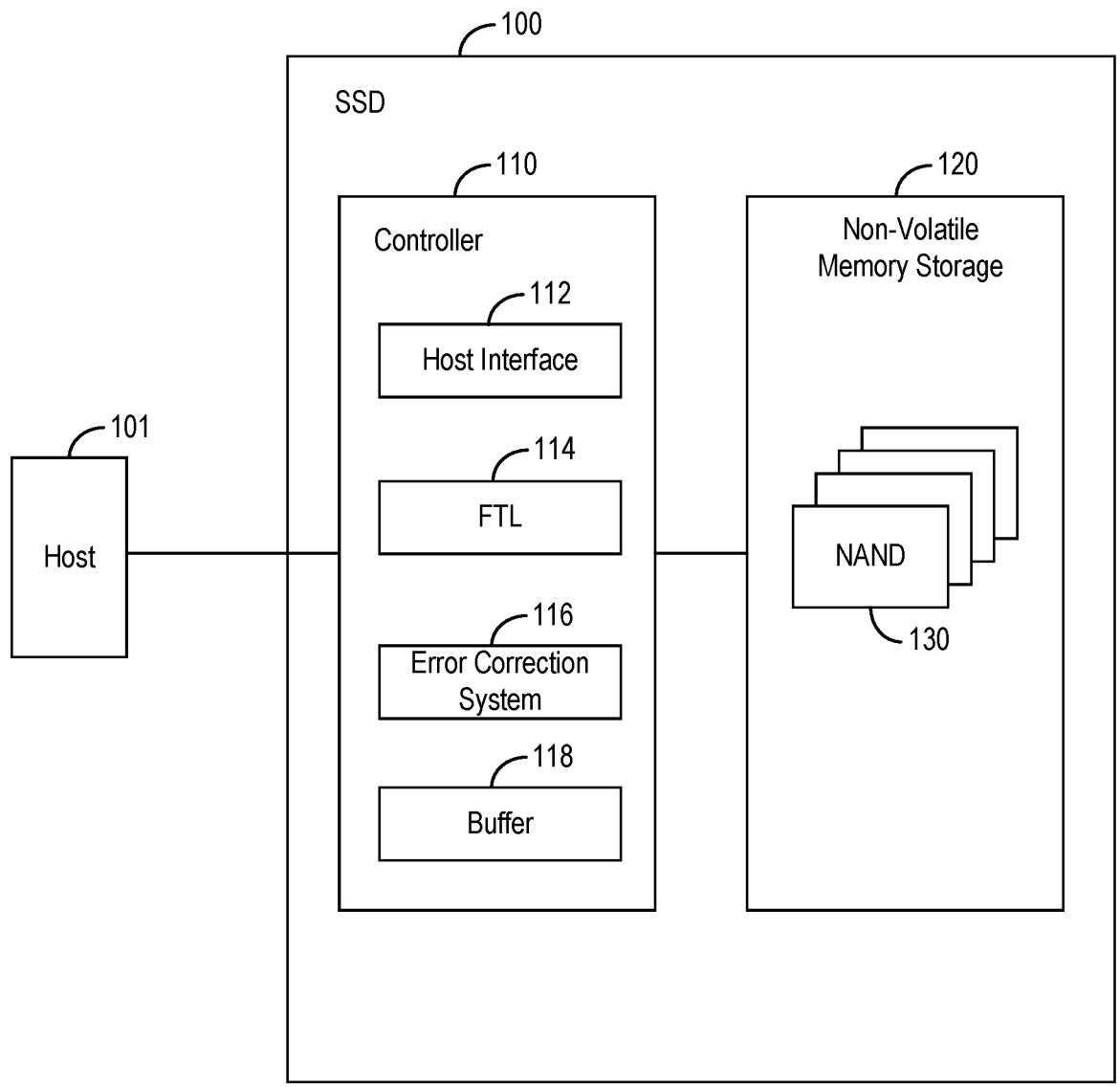
FIG. 1 shows a block diagram of examples of an SSD, according to some implementations.

Among other aspects, the present disclosure relates to determining locations on NAND flash memory devices of an SSD in which data is written. In some arrangements, the NAND flash memory devices can be partitioned by a controller into regions. Each region includes one or more pages or one or more blocks. A region may be a physical region or a logical region which is mapped to a physical region, where the mapping may be varied to accommodate wear leveling of the one or more blocks. Each region can be a "hotter" region or a "colder" region. A "hotter" region includes pages or blocks storing data that is frequently accessed (e.g., read or updated) by the host. In other words, a "hotter" region is a likely accessed region, area, or zone of the NAND flash memory devices. A "colder" region includes pages or blocks storing data that is infrequently accessed by the host. That is, a "colder" region includes pages or blocks storing data that is accessed less frequently than the data stored by pages or blocks of a "hotter" region. In that regard, a "colder" region is an unlikely accessed region, area, or zone of the NAND flash memory devices. In some arrangements, upon determining that the data is frequently accessed by the host in read operations, the controller moves the data to a "hotter" region. By storing frequently accessed data in some regions and infrequently accessed data in other regions, garbage collection can be performed efficiency as the regions containing infrequently accessed data rarely trigger garbage collection due to the static nature of the infrequently accessed data, thus reducing overhead associated with garbage collection.

In some arrangements, the controller can determine that a first range of LBAs corresponds to data that is updated or accessed frequently. Data corresponding to the first range of LBAs is written in a "hotter" region. In some arrangements, the controller can determine that a second range of LBAs corresponds to data that is updated or accessed infrequently. Data corresponding to the second range of LBAs are written in a "colder" region. In response to receiving an update command to update data corresponding to a given LBA from the host, the controller identifies one of the partitioned regions corresponding to the LBA and writes the updated, new data (referred to herein as "update data") in the identified region. Accordingly, the controller can physically or logically partition the NAND flash memory devices into different regions and identify one of these regions to write data without host assistance. That is, the host does not need to tag, label, or otherwise associate with an identifier, the incoming data aside from providing the LBA and the update data. In that regard, the present arrangements reduce host obligations in data placement in the manner described herein, allowing the SSD to function efficiently when interfacing with any host (including legacy database hosts that are not even aware that the storage employs SSDs).

To assist in illustrating the present implementations, FIG. 1 shows a block diagram of an SSD 100 according to some implementations. In some examples, the SSD 100 is located in a datacenter (not shown). The datacenter may include one or more platforms, racks, or cabinets, each of which supports one or more storage devices (such as but not limited to, the SSD 100). Storage devices can include a group or array of individual elements such as but not limited to, the SSD 100, where such elements are operatively coupled to one or more controllers contained within a storage appliance. In some implementations, the storage devices or appliances within a platform are connected to a Top of Rack (TOR) switch and can communicate with each other via the TOR switch or another suitable intra-platform communication mechanism. In some implementations, at least one router may facilitate communications among the storage devices in different platforms, racks, or cabinets.

The SSD 100 is a non-volatile memory storage device that includes at least a controller 110 and a non-volatile memory storage 120. Other components of the SSD 100 are not shown for brevity. The non-volatile memory storage 120 is a memory array that includes NAND flash memory devices 130. Each of the NAND flash memory devices 130 includes one or more individual NAND flash dies, which are non-volatile memory capable of retaining data without power. Each of the NAND flash memory devices 130 includes a die which has one or more planes. Each plane has multiple blocks, and each block has multiple pages. While the NAND flash memory devices 130 are shown to be examples of the non-volatile memory storage 120, other examples of non-volatile memory technologies for implementing the non-volatile memory storage 120 include but are not limited to, Magnetic Random Access Memory (MRAM), Phase Change Memory (PCM), Ferro-Electric RAM (FeRAM), or the like.

The controller 110 can combine raw data storage in the NAND flash memory devices 130 such that those NAND flash memory devices 130 function as a single storage. The controller 110 can include a host interface 112, an FTL 114, an error correction system 116, a buffer 118, among other features of the controller 110. Such components can be implemented in hardware such as processors (e.g., microcontrollers), software, firmware, or any combination thereof. In some arrangements, the software/firmware of the controller 110 can be stored in the non-volatile memory storage 120 or in any other suitable computer readable storage medium.

The controller 110 includes suitable processing and memory capabilities for executing functions described herein, among other functions. The controller 110 manages various features for the NAND flash memory devices 130 including, but not limited to, I/O handling, reading, writing/programming, erasing, monitoring, logging, error handling, garbage collection, wear leveling, logical to physical address mapping, data protection (encryption/decryption), and the like. Thus, the controller 110 provides visibility to the NAND flash memory devices 130.

The host 101 (e.g., a host device such as a personal computer) connects to the SSD 100 via the host interface 112, which conforms to a storage interface standard. The SSD 100 functions as an external storage device of the host 101. Examples of the communication interface standard implemented for the host interface 112 include standards such as but not limited to, Non-volatile Memory Express (NVMe), Serial Advanced Technology Attachment (SATA), Serial Attached SCSI (SAS), Peripheral Components Interconnect Express (PCIe), and so on.

The FTL 114 (e.g., a FTL interface module, a FTL processor, and so on) can process an address mapping table (e.g., a L2P mapping table). The address mapping table is a mapping table that keeps records of the correspondence between LBAs and physical addresses. For example, the address mapping table can translate read and write commands (received from the host 101) in connection with LBAs into low-level commands that reference physical blocks via physical addresses. In some examples, a read or write command received from the host 101 includes at least a logical block address (LBA). The LBA is a logical address that identifies a logical block, which may be a region in a sector. In some examples, the write command can also include a number of regions/sectors to which the data is to be written. The address mapping table stores mapping between each logical address and one or more physical addresses (e.g., pages of a memory die) where data of the logical address is stored. In some implementations, the FTL 114 can support multiple LBA ranges, each LBA range associated with a Logical Unit Number (LUN) or namespace identifier. The host 101 can refer to locations within the SSD 100 using a combination of LUN/namespace identifier, together with a LBA.

The FTL 114 can perform L2P operations based on the address mapping table. For example, the FTL 114 can translate a LUN/namespace and/or a LBA into a physical address, thus resolving the physical address corresponding to the LUN/namespace and/or the LBA. Responsive to receiving a write or read command (containing a LUN/namespace and/or a LBA therein) from the host 101, the FTL 114 can look up the physical address corresponding to the LUN/namespace and/or the LBA by using the address mapping table in order to write to or read from the physical address. The address mapping table can be stored in one or more of the non-volatile memory storage 120, a volatile memory, or another suitable memory of the controller 110.

The error correction system 116 of the controller 110 can include or otherwise implement one or more Error Correction Code (ECC) encoders and one or more ECC decoders. The ECC encoders are configured to encode data (e.g., input payload) to be programmed to the non-volatile memory storage 120 (e.g., to the NAND flash memory devices 130) using suitable ECC. The ECC decoders are configured to decode the encoded data to correct programming errors, errors caused by reading with non-optimal thresholds, errors caused by retention/read-disturb stresses, and so on. In other words, the ECC decoder can correct read errors (e.g., read-disturb sense errors, data retention errors, and so on) when stored data is read.

The buffer 118 is a local memory of the controller 110. In some examples, the buffer 118 is a volatile storage. Examples of the buffer 118 include but are not limited to, Random Access Memory (RAM), Dynamic Random Access Memory (DRAM), and Static Random Access Memory (SRAM). In response to receiving write commands and associated data from the host 101 (via the host interface 112), the controller 110 acknowledges the write commands to the host 101 responsive to writing the data to the buffer 118. The controller 110 can write the data stored in the buffer 118 to the non-volatile memory storage 120. Once writing the data to physical addresses of the non-volatile memory storage 120 is complete, the FTL 114 updates mapping between LBAs associated with the data and the physical addresses identifying the physical locations, for example, in the L2P mapping table.

Figure 3:
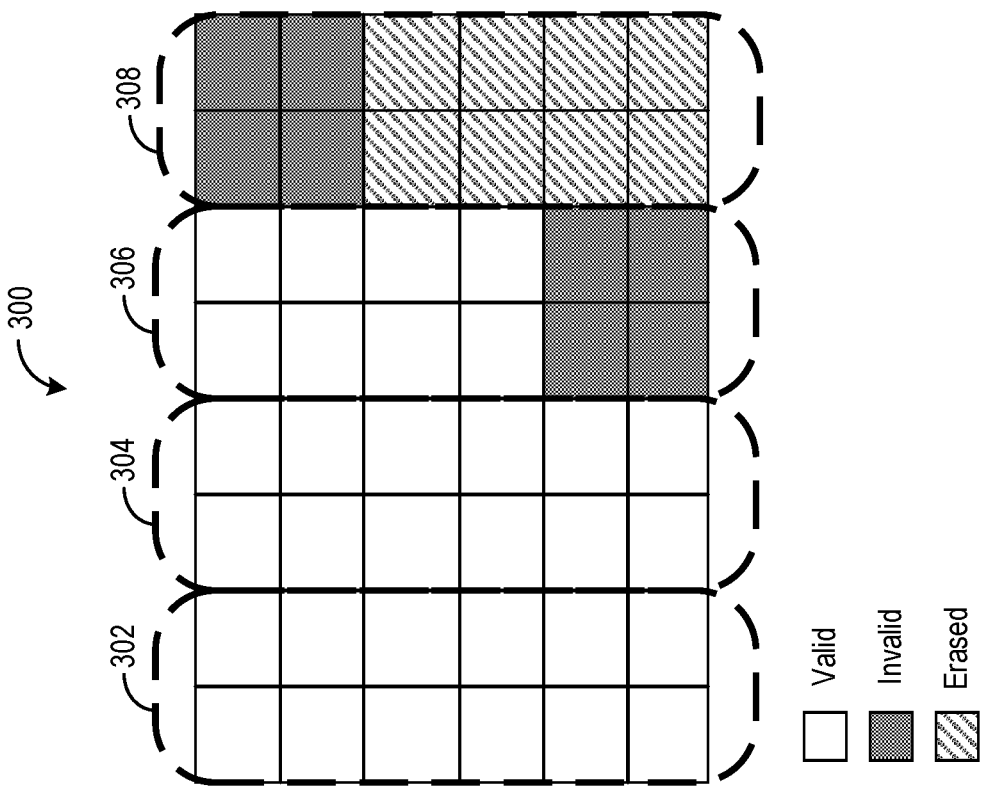
FIG. 3 is a diagram illustrating data placement on a non-volatile memory storage, according to various implementations.
Figure 2:
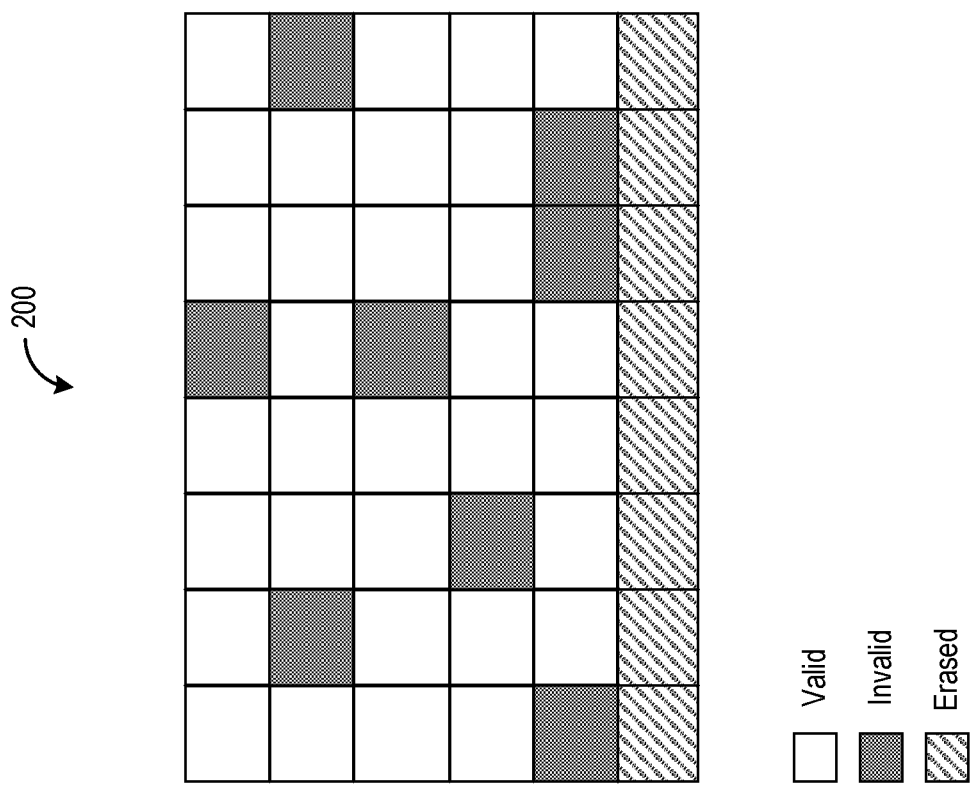
FIG. 2 is a diagram illustrating data placement on a non-volatile memory storage, according to various implementations.

FIG. 2 is a diagram illustrating data placement 200 on the non-volatile memory storage 120 (FIG. 1) at a given time, according to various implementations. FIG. 3 is a diagram illustrating data placement 300 on the non-volatile memory storage 120 (FIG. 1) at a given time, according to various implementations. Referring to FIGS. 1-3, the controller 110 (e.g., the FTL 114) places data into pages within blocks of the non-volatile memory storage 120 by determining a physical address corresponding to an LBA of the data. Each of the blocks is shown as a square in FIGS. 2 and 3. Each of the blocks have multiple pages. The blocks shown in the data placement 200 and 300 include blocks containing only valid data pages, blocks containing some invalid data pages (garbage), and blocks with data erased. The blocks with data erased can be written with new data pages. The blocks containing only valid data pages are shown as unshaded squares. A block with all its pages recently written is in this state. The blocks containing some invalid data pages are shown as squares with a first shading as shown. Blocks with some of its data recently updated since being first written are in this state. The blocks with data erased are shown as squares with a second shading as shown. Blocks that have been garbage collected or erased are in this state. Blocks that are physically adjacent in the NAND flash memory devices 130 as shown as adjacent squares in FIGS. 2 and 3. A block containing invalid data may eventually become candidates for garbage collection when a number of valid pages of the block falls below a threshold or the valid pages have reached a certain age. Once garbage collection completes and those blocks with invalid data are erased, the blocks are available for data to be written/programmed thereon, as a block with data erased.

After data for a given LBA is written to the NAND flash memory devices 130, the host 101 can read the data via a read operation and updating of the data via a write operation in situ is not possible. Instead, to update the data stored in a first physical address (corresponding to a page of a block), the controller 110 (e.g., the FTL 114) determines a second physical address (different from the first physical address) that corresponds to the next available location and maps the second physical address to the LBA after writing the data to the second physical address. After the update, the first physical address contains outdated or invalid data (garbage) that eventually becomes erased in a following garbage collection process.

In some arrangements, the FTL 114 initially places data on the blocks of the NAND flash memory devices 130 based on free area available as shown in the data placement 200, resulting in adjacent physical addresses (e.g., adjacent pages within blocks and adjacent blocks) storing data for different applications of the host 101 or even for different hosts. This may result in writes to sequential LBAs by one application becoming mixed up with writes to entirely unrelated LBAs by other applications or hosts.

A same type of data for a same application tend to have similar frequencies of access while different types of data for different applications tend to have different frequencies of access. Given that it is likely that adjacent physical addresses (pages) store data for different applications of the host 101 or even for different hosts, frequencies of access for data stored in pages in a same block can vary considerably. As shown in the data placement 200, where squares can also represent pages within a block containing valid data becoming interleaved with pages within the same block containing invalid data. The presence of invalid data pages within blocks, eventually requires the valid data to be relocated by reading and re-writing to a different, freshly erased block as part of a background garbage collection process. This background garbage collection process may interfere with host I/O, causing additional latency as the background garbage collection process involves erasing blocks, and reading and writing pages, all of which can cause additional latency to host I/O operations. The more fragmented blocks become with valid data pages being interspersed with invalid pages, the more garbage collection becomes needed with an attendant increase in latencies due to background read, write, and erase operations.

Invalid data located in a physical address is erased before new data is written to that physical address as data cannot be overwritten in the same physical address. In the SSD 100, data is written and read by pages and erased by blocks. In a garbage collection process, valid data currently stored in a first block can be relocated (copied) to a page of a second block before the first block can be erased. After the valid data is relocated to a new location, the FTL 114 updates the physical address for the valid data to be the physical address of the new location by mapping the physical address of the new location to the LBA of the valid data. While the physical address of the data may change from time to time due to garbage collection, the LBA of the data, which is how the host 101 identifies the data, remains static during garbage collection.

Accordingly, data can be relocated throughout the blocks of the NAND flash memory devices 120 after being initially written. Data that is frequently updated by the host 101 creates significantly more invalid data to be erased within a given time interval than that created by data that is infrequently updated by the host 101. In addition, data that is infrequently updated by the host 101 is relocated frequently in garbage collection processes so that the controller can re-use the blocks to store new data. To reduce power and processing overhead associated with garbage collection, the controller 110 can store frequently accessed data in the "hotter" region (e.g., a likely accessed region) while storing infrequently accessed/updated data in the "colder" region (e.g., an unlikely accessed region), thus reducing the need to relocate of valid and infrequently accessed data in the garbage collection process. This is because such mechanism reduces the likelihood that valid data and invalid data are interspersed within same block or in adjacent blocks.

In that regard, the controller 110 (e.g., the FTL 114) can partition the blocks of the NAND flash memory devices into regions 302, 304, 306, and 308, as shown in the data placement 300. Each of the region 302, 304, 306, and 308 includes one or more blocks. Each of the region 302, 304, 306, and 308 can be a likely accessed region or an unlikely accessed region. A likely accessed region (e.g., the regions 306 and 308) contains blocks that are considered frequently accessed. An unlikely accessed region (e.g., the regions 302 and 304) contains blocks that are considered frequently accessed.

Within a block, pages that are subjected to greater numbers of read operations or pages adjacent to such pages suffer greater numbers of bits read in error, due to a phenomenon called "read disturb." Reading a memory page requires bias voltage to be applied to memory lines not being read which is equivalent to a mild programming effect. The bias voltage can build up to cause errors as the number of reads performed increases. As a result, the number of read errors relate to the number of times pages have been read, or to the access frequency. After data is initially stored in the pages within blocks as shown in the data placement 200, the controller 110 determines the access frequency of each page with a block based on read errors and partitions the pages within blocks based on the access frequency of pages within each block, thus migrating from the data placement 200 to the data placement 300 over time. Upon determining that data is frequently accessed by the host 101, the controller 101 moves the data to a likely accessed region in which garbage collection is performed more frequently than an unlikely accessed region.

For example, the controller 110 can determine that a first range of LBAs corresponds to data that is accessed (read or updated) frequently. Data corresponding to the first range of LBAs is written in a likely accessed region. In some arrangements, the controller 110 can determine that a second range of LBAs corresponds to data that is updated or accessed infrequently. Data corresponding to the second range of LBAs are written in an unlikely accessed region. In response to receiving an update command to update data corresponding to a given LBA from the host 101, the controller 110 identifies one of the partitioned regions 302, 304, 306, and 308 corresponding to the LBA and writes the update data in the identified region.

In some implementations, the controller 110 can partition the blocks such that the regions 302, 304, 306, and 308 store data with varying degrees of access frequencies. For example, the controller 110 can designate blocks in the region 302 to store data with the lowest access frequencies. The controller 110 can designate blocks in the region 304 (adjacent to the regions 302 and 306) to store data with the second lowest access frequencies. The controller 110 can designate blocks in the region 306 (adjacent to the regions 304 and 308) to store data with the second highest access frequencies. The controller 110 can designate blocks in the region 308 (adjacent to the region 306) to store data with the highest access frequencies. In that regard, the blocks in the region 308 have the highest rate for garbage collection, such that at the time of the data placement 300, some blocks in the region 308 have been erased and ready to store data that is frequently updated while other blocks in the region 308 contain invalid data and are ready for garbage collection. The blocks in the region 302 have the lowest rate for garbage collection, such that at the time of the data placement 300, most blocks in the region 302 contain valid data that is most likely resident on those blocks for a long period of time.

Figure 4:
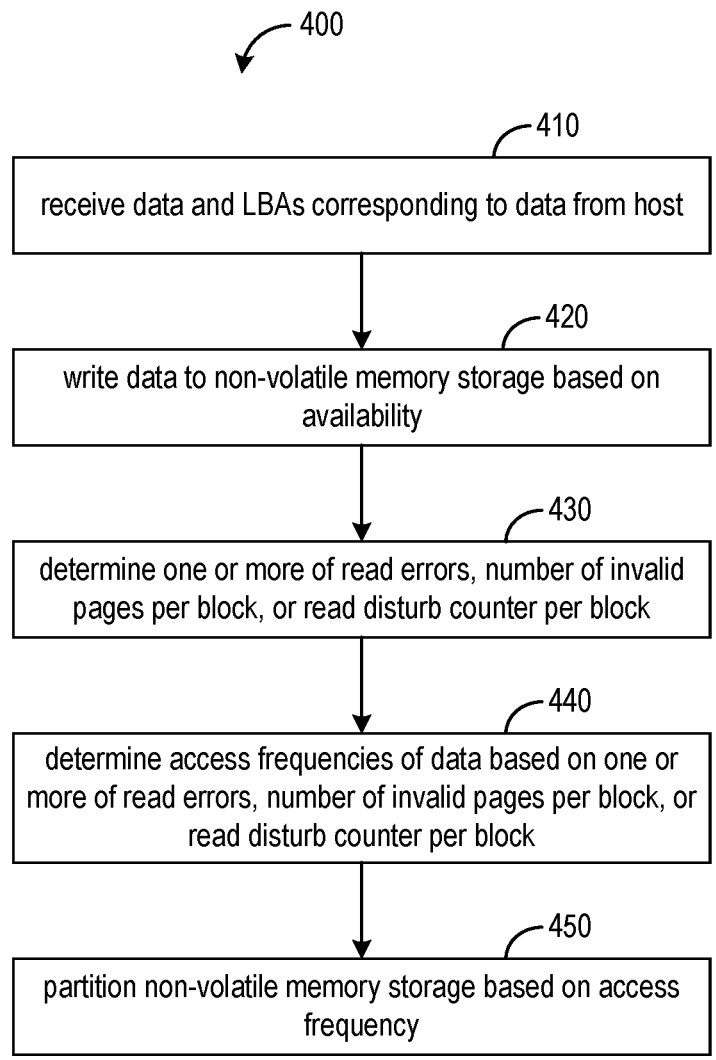
FIG. 4 is a process flow diagram illustrating an example method for placing data in a non-volatile memory storage of an SSD, according to various implementations.

FIG. 4 is a process flow diagram illustrating an example method 400 for placing data in the non-volatile memory storage 120 of the SSD 100 (FIG. 1), according to some implementations. Referring to FIGS. 1-4, the controller 110 can partition the non-volatile memory storage 120 into the regions (e.g., the regions 303, 304, 306, and 308) using the method 400.

At 410, the controller 110 receives data and LBAs corresponding to the data from the host 101. In some examples, the host 101 sends write commands to the SSD 100. The write command includes the data and the LBAs. The controller 110 receives the data and the LBAs via the host interface 112.

At 420, the controller 110 writes (programs) the data to the non-volatile memory storage 120 based on availability. That is, the controller 110 writes the data to locations (identified by physical addresses) of the NAND flash memory devices 130. The FTL 114 can translate the LBAs into physical addresses based on availability. For example, the controller 110 can write data sequentially to next available locations (available pages in available blocks) of the NAND flash memory devices 130. The controller 110 (e.g., the FTL 114) determines physical addresses that correspond to the next available locations and maps the physical addresses to the LBAs after writing the data to the physical addresses. In one example, the data can be placed on the NAND flash memory devices 130 according to the data placement 200.

At 430, the controller 110 determines, for the data written at 420, one or more of read errors, a number of invalid pages per block, or read disturb counter per block. The controller 110 can monitor data access (the access frequencies) by determining read errors on the NAND flash memory devices 130. Examples of the read errors include but are not limited to, read disturb errors, data retention errors, and so on. Data retention errors occur when data is written to memory cells but then left for long periods of time, which causes the electrical charge on the memory cells to gradually diminish through leakage, giving rise to data bit errors as the cells are read because the charge on the cells is no longer the same as the charge when first written. The longer data is retained in the memory, the greater is the number of retention errors. The read errors are errors experienced when reading data from a given location (e.g., a page) of the NAND flash memory devices 130. The read errors are determined by the error correction system 116 when the data is read.

At 440, the controller determines access frequencies of the data based on the one or more of the read errors, the number of invalid pages per block, or the read disturb counter per block. In some examples, the access frequencies correspond to access time of the data (the time since the data is last accessed) after the data has been placed on the NAND flash memory devices 130. The access frequencies are determined for each block on which the data has been placed.

In some arrangements, the access frequencies can be determined based on the last time that the LBA is accessed (e.g., read or updated). If the data is accessed recently (e.g., within thousands of I/O operations), then the block on which the data is stored is frequently accessed. If the data is accessed a long time ago (e.g., more than tens of thousands of I/O operations), then the block on which the data is stored is infrequently accessed. In some examples, the controller 110 can record an access time each time an LBA is accessed. The controller 110 can store a timestamp for the access time every time a block storing the data corresponding to the LBA is accessed. Storing timestamps require considerable amount of memory in the SRAM and DRAM of the controller 110. In some cases, such mechanism may result in an extremely large and unmanageable demand for memory.

In other arrangements, categorization of types of data according to the read and write or update access frequencies of the data can be performed based on the read errors, block read disturb counters, and the number of invalid pages in a block. Increasing read access frequency may give rise to increasing errors due to read disturb effects, while the longer the data has been retained in a given page, the more read errors (e.g., data retention error) the page storing the data will accumulate. The longer the data has been stored on a given page, the less frequently the data is written or updated. Given that data is typically written in sequence one page after another within a block, the read errors with respect to a given page of a block storing the data can be used to approximate the read errors for the entire block. Sequential writing of pages also means that the time at which the pages were originally written will be approximately the same for all the pages in a given block. In addition, the number of invalid pages in a block increases as time increases due to more and more of the data written on the pages of the block becoming updated. Increasing time also increases the number of errors (e.g., retention errors) for the remaining valid pages due to long periods of retention.

In some arrangements, the controller 110 maintains a read disturb counter for each memory block in order to assist the process of refreshing data that is in danger of becoming irretrievably corrupted due to read disturb effects. In one example, a limit is set (predefined) for the read disturb counter. In response to determining that the read disturb errors exceeding the limit, the controller 110 assesses the error rate of pages within the block and determines whether the data should be refreshed, by reading the data pages of the block, correcting any errors caused by read disturb effects, and copying the corrected data to pages in a different, freshly erased block. The read disturb counter can be used in conjunction with the number of errors as reflected in a parameter such as but not limited to, a Bit Error Rate (BER), encountered when reading the pages to provide an estimate of the read access frequency.

For example, pages exhibiting a high BER in a block with a low read disturb counter, can be classified by the controller 110 as pages with a low access frequency, given that the high BER is most likely be due to retention errors caused by a long retention period. The controller 110 can delay classification of pages with a low BER as those pages in the block may only have recently be written such that it is not possible to determine a classification in a short period of time. On the other hand, the controller 110 can classify pages in a block exhibiting a high read disturb counter according to the BER for those pages. For instance, pages exhibiting a very high BER can be classified as pages with high access frequency, pages having a high BER can be classified as pages with medium access frequency, and pages having a medium BER can be classified as pages with low access frequency.

In another example, valid pages remaining in a block having few invalid pages can be classified by the controller 110 as read-type pages, because those pages have yet to be updated (whence they would be invalidated). A background, average, or initial level of expected read errors (an average expected level of read errors) can be determined by the controller 110 based on the number of invalid pages and the read disturb counter. The number of invalid pages is an indicator of the age of the block and the expected number of data retention type errors. The read disturb counter is an indicator of the number reads of pages in the block and of the expected number of read disturb type errors. A low number of invalid pages in the data block coupled with a low read disturb counter indicate a relatively young block (a block with data that is written recently), with a low background level of expected data retention and read disturb errors.

The average expected level of errors (ELRE) for a page can be adjusted according to the number of invalid pages (NIP) and the read disturb counter (RDC), for example, using expression (1):

$$ELRE = K1*NIP + K2*RDC \tag{1},$$

where K1 and K2 are constants determined by direct measurement of blocks with varying number of invalid pages and read disturb counters. The read access frequency of a page can be determined by comparing the actual BER measured for the page compared to the ELRE for the block. The controller 110 can determine whether condition (2) is satisfied:

$$BER > ELRE + Eth \tag{2},$$

where Eth is an error threshold. In response to determining that condition (2) is true, access frequency is high. That is, the access frequency is higher than an average expected level of access frequency because the actual BER is higher than the average expected level of read errors for the block plus the error threshold. The controller 110 can determine whether condition (3) is satisfied:

$$BER < ELRE - Eth \tag{3}.$$

In response to determining that condition (3) is true, access frequency is low. That is, the access frequency is lower than an average expected level of access frequency because the actual BER is lower than the average expected level of read errors less the error threshold. The controller 110 can determine whether condition (4) is satisfied:

$$ELRE - Eth < BER < ELRE + Eth \tag{4}$$

In response to determining that condition (4) is true, access frequency is medium. That is, the access frequency within a tolerance level of the average expected level of access frequency because the actual BER is within a tolerance level of the average expected level of read errors for the block +/- the error threshold. Accordingly, the controller 110 can determine the read access frequency for a page in a block is high, medium, or low in response to determining the number of the read errors of the page in the block, the number of invalid pages, and the read disturb counter.

At 450, the controller 110 partitions the non-volatile memory storage 120 into a plurality of regions (e.g., the regions 302, 304, 306, and 308) based on the access frequencies. Blocks storing data pages that are accessed more frequently are grouped in a first region (e.g., the region 308) while blocks storing data pages that are accessed less frequently are grouped in a second region (e.g., the region 302), for example, as shown in the data placement 300. Garbage collection is performed more frequently in the first region than in the second region.

In some examples, a first block adjacent to two or more second blocks having similar access frequencies can be grouped with the second blocks, even though the first block may have an access frequency different from those of the second blocks. In that regard, the first block and the second blocks can form a larger region configured to store data having similar access frequencies, while the data originally stored in the first block can be relocated to another block having a similar access frequency than the first block.

Figure 5:
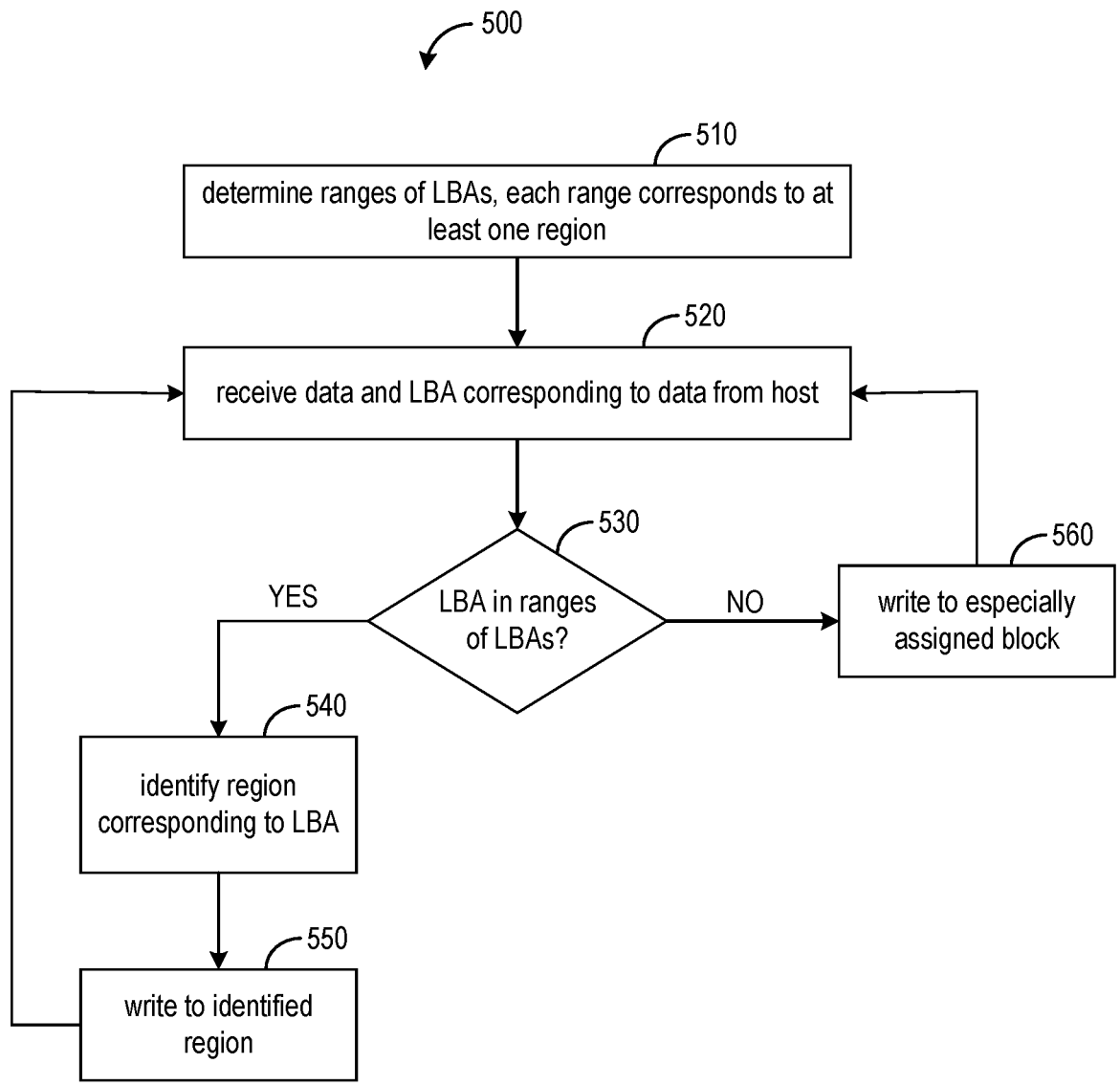
FIG. 5 is a process flow diagram illustrating an example method for placing data in a non-volatile memory storage of an SSD, according to various implementations.

FIG. 5 is a process flow diagram illustrating an example method 500 for placing data in the non-volatile memory storage 120 of the SSD 100 (FIG. 1), according to some implementations. Referring to FIGS. 1-5, the controller 110 can identify one of the partitioned regions (e.g., the regions 303, 304, 306, and 308) to store data using the method 500.

At 510, the controller 110 determines ranges of LBAs, each of which corresponds or maps to at least one of the regions partitioned at 450. In some examples, once the regions are partitioned at 450, the LBAs corresponding to data stored in each of the regions are identified. For example, the controller 110 identifies that a first range of LBAs maps to the region 302 because data corresponding to the first range of LBAs are stored in blocks in the region 302. The controller 110 identifies that a second range of LBAs maps to the region 304 because data corresponding to the second range of LBAs are stored in blocks in the region 304. The controller 110 identifies that a third range of LBAs maps to the region 306 because data corresponding to the third range of LBAs are stored in blocks in the region 306. The controller 110 identifies that a fourth range of LBAs maps to the region 308 because data corresponding to the fourth range of LBAs are stored in blocks in the region 308.

At 520, the controller 110 receives data and an LBA corresponding to the data from the host 101. In some examples, the host 101 sends a write command or an update command to the SSD 100. The write/update command includes the data and the LBA. The controller 110 receives the data and the LBA via the host interface 112.

At 530, the controller 110 (e.g., the FTL 114) determines whether the received LBA is in the ranges of LBAs. The received LBA being in the ranges of LBAs means that another version of the data corresponding to the received LBA is currently stored in the NAND flash memory devices 130 and has become outdated, given that the received data is update data that replaces the currently stored data. The received LBA being outside of the ranges of LBAs means that data corresponding to the received LBA has not been previously stored in the NAND flash memory devices 130.

In response to determining that the LBA is not in the ranges of LBAs (530:NO), the controller 110 writes the received data to a page in an especially assigned block, at 560. The FTL 114 can determine the especially assigned block. In some examples, the especially assigned block is a block of the NAND flash memory devices 130 that is outside of any of the partitioned regions. In other words, the especially assigned block can be used to store data corresponding to new LBAs. In other examples, the especially assigned block can be a designated block in a likely accessed region or an unlikely accessed region by default.

On the other hand, in response to determining that the LBA is in the ranges of LBAs (530: YES), the controller 110 writes data to a block in one of the partitioned regions based on access frequency of the data and the access frequencies of the partitioned regions (e.g., at blocks 540 and 550). At 540, the controller 110 (e.g., the FTL 114) identifies a region corresponding to the LBA. For instance, the FTL 114 identifies one of the different ranges of LBAs that the received LBA belongs, and the region mapped to the identified range is determined. In that regard, data determined to be frequently accessed is written in a block in a likely accessed region (e.g., the region 308) while data determined to be infrequently accessed is written in a block in an unlikely accessed region (e.g., the region 302).

In some examples, the controller 110 writes first data to a first location on the non-volatile memory storage 120 (e.g., at 420), according to the data placement 200. The first data corresponds to a first LBA. The controller 110 can determine that the first data is frequently accessed based on a first frequency by which the first data is accessed. The controller 110 determines that the first data is frequently accessed in response to determining, based on the read errors, that the page or block on which the first data is stored is frequently accessed (e.g., at 430 and 440). In some examples, the first data is frequently accessed if the first LBA is in a range of LBAs mapped to a likely accessed region (e.g., the region 308) as determined at 510.

In response to determining that the first data is frequently accessed, the controller 110 relocates the first data to a second location on the non-volatile memory storage 120, according to the data placement 300. For example, the controller 110 can receive update data and the first LBA from the host 101 to update the data associated with the first LBA, e.g., at 520. Relocating the first data to the second location includes writing the update data to the second location, e.g., at 530-550. The second location being in a first region (e.g., the region 308) allocated to store data that is frequently accessed. The first location is a first page located outside of the first region. The first location is identified by a first physical address. The second location is a second page located inside of the first region. The second location is identified by a second physical address different from the first physical address.

In some examples, the controller 110 writes second data to a third location on the non-volatile memory storage 120 (e.g., at 420), according to the data placement 200. The second data corresponds to a second LBA. The controller 110 can determine that the second data is infrequently accessed based on a second frequency by which the first data is accessed. The controller 110 determines that the second data is infrequently accessed in response to determining, based on the read errors, that the page or block on which the second data is stored is infrequently accessed (e.g., at 430 and 440). In some examples, the second data is infrequently accessed if the second LBA is in a range of LBAs mapped to an unlikely accessed region (e.g., the region 302) as determined at 510.

In response to determining that the second data is infrequently accessed, the controller 110 relocates the second data to a fourth location on the non-volatile memory storage 120, according to the data placement 300. For example, the controller 110 can receive update data and the second LBA from the host 101 to update the data associated with the second LBA, e.g., at 520. Relocating the second data to the fourth location includes writing the update data to the fourth location, e.g., at 530-550. The fourth location being in a second region (e.g., the region 302) allocated to store data that is infrequently accessed. The third location is a third page located outside of the second region. The third location is identified by a third physical address. The fourth location is a fourth page located inside of the second region. The fourth location is identified by a fourth physical address different from the third physical address.

In some arrangements, machine learning (e.g., deep learning) can be implemented to partition the blocks into different regions and to determine a physical address corresponding to a received LBA. In some examples, at 440, deep learning can be used to categorize a block as belonging to a likely accessed region or an unlikely accessed region based on the read error rates obtained by the error correction system 116 during read operations. The determination of a block belonging to a likely accessed region or an unlikely accessed region may dependent on small variations in the number of read errors or read error rates within a short time interval. Given that deep learning excels at pattern recognition and efficient data extrapolation based on a small dataset, deep learning algorithms with unsupervised learning can be implemented. The AI or deep learning mechanism can be implemented with the controller 110 (e.g., the FTL 114) and firmware thereof.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout the previous description that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

It is understood that the specific order or hierarchy of steps in the processes disclosed is an example of illustrative approaches. Based upon design preferences, it is understood that the specific order or hierarchy of steps in the processes may be rearranged while remaining within the scope of the previous description. The accompanying method claims present elements of the various steps in a sample order, and are not meant to be limited to the specific order or hierarchy presented.

The previous description of the disclosed implementations is provided to enable any person skilled in the art to make or use the disclosed subject matter. Various modifications to these implementations will be readily apparent to those skilled in the art, and the generic principles defined herein may be applied to other implementations without departing from the spirit or scope of the previous description. Thus, the previous description is not intended to be limited to the implementations shown herein but is to be accorded the widest scope consistent with the principles and novel features disclosed herein.

The various examples illustrated and described are provided merely as examples to illustrate various features of the claims. However, features shown and described with respect to any given example are not necessarily limited to the associated example and may be used or combined with other examples that are shown and described. Further, the claims are not intended to be limited by any one example.

The foregoing method descriptions and the process flow diagrams are provided merely as illustrative examples and are not intended to require or imply that the steps of various examples must be performed in the order presented. As will be appreciated by one of skill in the art the order of steps in the foregoing examples may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the examples disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The hardware used to implement the various illustrative logics, logical blocks, modules, and circuits described in connection with the examples disclosed herein may be implemented or performed with a general purpose processor, a DSP, an ASIC, an FPGA or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In some exemplary examples, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storages, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed examples is provided to enable any person skilled in the art to make or use the present disclosure. Various modifications to these examples will be readily apparent to those skilled in the art, and the generic principles defined herein may be applied to some examples without departing from the spirit or scope of the disclosure. Thus, the present disclosure is not intended to be limited to the examples shown herein but is to be accorded the widest scope consistent with the following claims and the principles and novel features disclosed herein.

What is claimed is:

1. A method, comprising:
    writing data to a non-volatile memory storage of a Solid State Drive (SSD) having a controller, the non-volatile memory storage having a plurality of blocks, each block having a plurality of pages, wherein writing the data to the non-volatile memory storage comprises writing first data to a first location on the non-volatile memory storage, and wherein the first data corresponds to a first LBA;
    determining one or more of read errors, a number of invalid pages per block, or a read disturb counter for the data;
    determining access frequency of the data based on a classification using both the one or more of the read errors, the number of invalid pages per block, or the read disturb counter as a first classification parameter and a BER associated with the data as a second classification parameter;
    partitioning, by the controller of the SSD, the non-volatile memory storage into a plurality of regions based on the determined access frequency, each of the plurality of regions comprises one or more blocks of the plurality of blocks;
    based on the partitioning by the controller of the SSD, identifying a plurality of ranges of logical block addresses (LBAs) respectively corresponding to the plurality of regions, wherein the first LBA is within a first range of LBAs that have been identified as corresponding to a first region containing data that is frequently accessed;
    receiving from a host, subsequent to writing the first data to the first location, update data and the first LBA corresponding to the first data; and
    in response to receiving the update data and the first LBA from the host:
        comparing the first LBA with the plurality of ranges of LBAs,
        identifying a second location in the first region of the non-volatile memory storage allocated to store data that is frequently accessed, the identifying including determining, based on the comparing, that the first LBA is within the first range of LBAs corresponding to the first region containing data that is frequently accessed, and not within any other of the plurality of ranges of LBAs corresponding to other of the plurality of regions, and
        relocating the first data to the second location on the non-volatile memory storage by writing the update data to the second location, wherein the first location is outside the first region.

2. The method of claim 1, wherein the read errors comprises one or more of read-disturb sense errors or data retention errors.

3. The method of claim 1, wherein the read errors are determined by an error correction system of a controller of the SSD when the data is read.

4. The method of claim 1, wherein determining the access frequency of the data comprises:
    determining that the access frequency is high in response to determining that a number of the read errors is low; and
    determining that the access frequency is low in response to determining that the number of the read errors is high.

5. The method of claim 1, wherein determining the access frequency of the data comprises:
    determining a first access frequency of data written on each of first blocks of the non-volatile memory storage; and
    determining a second access frequency of data written on each of second blocks of the non-volatile memory storage, the first access frequency being higher than the second access frequency.

6. The method of claim 5, wherein partitioning the non-volatile memory storage into the plurality of regions comprises:
    determining the first region comprising the first blocks; and
    determining a second region comprising the second blocks.

7. The method of claim 6, wherein
    first data determined to be frequently accessed is written in one of the first blocks in the first region; and
    second data determined to be infrequently accessed is written in one of the second blocks in the second region.

8. The method of claim 7, wherein garbage collection is performed more frequently in the first region than in the second region.

9. The method of claim 1, wherein
    the non-volatile memory storage comprises one or more NAND flash memory devices having blocks, each of the blocks comprising multiple pages;
    the first location is a first page located outside of the first region;
    the first location is identified by a first physical address;
    the second location is a second page located inside of the first region;
    the second location is identified by a second physical address different from the first physical address; and
    the first region comprises one or more of the blocks.

10. The method of claim 1, wherein
    writing the data to the non-volatile memory storage comprises writing second data to a third location on the non-volatile memory storage;
    the method further comprises:
        determining that the second data is infrequently accessed based on a second frequency by which the second data is accessed; and
        in response to determining that the second data is infrequently accessed, relocating the second data to a fourth location on the non-volatile memory storage, the fourth location being in a second region of the non-volatile memory storage allocated to store data that is infrequently accessed.

11. The method of claim 10, wherein
    the non-volatile memory storage comprises one or more NAND flash memory devices having blocks, each of the blocks comprising multiple pages;
    the third location is a third page located outside of the second region;
    the third location is identified by a third physical address;

the fourth location is a fourth page located inside of the second region;
the fourth location is identified by a fourth physical address different from the third physical address; and
the second region comprises one or more of the blocks.

12. The method of claim 10, wherein
the second data corresponds to a second LBA;
the method further comprises receiving update data and the second LBA from a host; and
relocating the second data to the fourth location comprises writing the update data to the fourth location based on a comparison of the second LBA with the plurality of ranges of LBAs.

13. The method of claim 1, wherein the non-volatile memory storage is partitioned into the plurality of regions by deep learning based on the access frequency.

14. The method of claim 1, further comprising determining an average expected level of errors based on the number of invalid pages per block and the read disturb counter, wherein the access frequency is determined based on a Bit Error Rate (BER), the average expected level of errors, and an error threshold.

15. The method of claim 14, the access frequency is determined to be high in response to determining that the BER is greater than the average expected level of errors plus the error threshold.

16. The method of claim 14, the access frequency is determined to be low in response to determining that the BER is less than the average expected level of errors minus the error threshold.

17. The method of claim 14, the access frequency is determined to be medium in response to determining that the BER is greater than the average expected level of errors minus the error threshold and less than the average expected level of errors plus the error threshold.

18. A Solid State Drive (SSD) device, comprising:
a non-volatile memory storage; and
a controller that:
writes data to the non-volatile memory storage, the non-volatile memory storage having a plurality of blocks, each block having a plurality of pages, wherein writing the data to the non-volatile memory storage comprises writing first data to a first location on the non-volatile memory storage, and wherein the first data corresponds to a first LBA;
determines one or more of read errors, a number of invalid pages per block, or a read disturb counter for the data;
determines access frequency of the data based on a classification using both the one or more of the read errors, the number of invalid pages per block, or the read disturb counter as a first classification parameter and a BER associated with the data as a second classification parameter;
partitions the non-volatile memory storage into a plurality of regions based on the determined access frequency, each of the plurality of regions comprises one or more blocks of the plurality of blocks;
based on the partitioning, identifies a plurality of ranges of logical block addresses (LBAs) respectively corresponding to the plurality of regions, wherein the first LBA is within a first range of LBAs that have been identified as corresponding to a first region containing data is frequently accessed;
receives from a host, subsequent to writing the first data to the first location, update data and the first LBA corresponding to the first data; and
in response to receiving the update data and the first LBA from the host:
compares the first LBA with the plurality of ranges of LBAs,
identifies a second location in the first region of the non-volatile memory storage allocated to store data that is frequently accessed, the identifying including determining, based on the comparing, that the first LBA is within a first range of LBAs corresponding to the first region containing data that is frequently accessed, and
relocates the first data to the second location on the non-volatile memory storage by writing the update data to the second location, wherein the first location is outside the first region.

19. A non-transitory computer-readable medium storing computer-readable instructions, such that when executed, causes a controller of a Solid State Drive (SSD) device to:
write data to a non-volatile memory storage of the SSD, the non-volatile memory storage having a plurality of blocks, each block having a plurality of pages, wherein reads of the non-volatile memory storage are performed on a page basis, and wherein writing the data to the non-volatile memory storage comprises writing first data to a first location on the non-volatile memory storage, and wherein the first data corresponds to a first LBA;
determine one or more of read errors, a number of invalid pages per block, or a read disturb counter for the data;
determine access frequency of the data based on a classification using both the one or more of the read errors, the number of invalid pages per block, or the read disturb counter as a first classification parameter and a BER associated with the data as a second classification parameter; and
partition the non-volatile memory storage into a plurality of regions based on the determined access frequency, each of the plurality of regions comprises one or more blocks of the plurality of blocks;
based on the partitioning, identifies a plurality of ranges of logical block addresses (LBAs) respectively corresponding to the plurality of regions, wherein the first LBA is within a first range of LBAs that have been identified as corresponding to a first region containing data that is frequently accessed;
receive from a host, subsequent to writing the first data to the first location, update data and the first LBA corresponding to the first data; and
in response to receiving the update data and the first LBA from the host:
compare the first LBA with the plurality of ranges of LBAs,
identify a second location in the first region of the non-volatile memory storage allocated to store data that is frequently accessed, the identifying including determining, based on the comparing, that the first LBA is within the first range of LBAs corresponding to the first region containing data that is frequently accessed, and
relocate the first data to the second location on the non-volatile memory storage by writing the update data to the second location, wherein the first location is outside the first region.

20. The method of claim 1, wherein the access frequency is determined based on a comparison with a determined Bit Error Rate (BER) and an average expected level of errors.

* * * * *